A. MORASKI.
ROTARY INTERNAL COMBUSTION ENGINE.
APPLICATION FILED MAY 19, 1914.
1,119,189.
Patented Dec. 1, 1914.
4 SHEETS—SHEET 2.
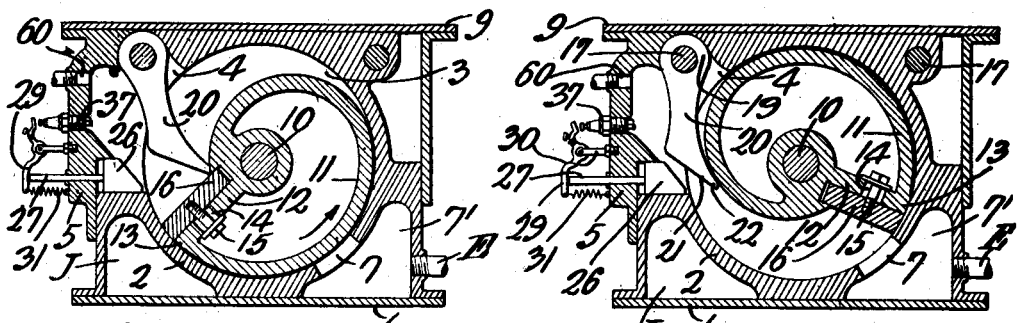
Witnesses
Ambrose Moraski, Inventor
by C. A. Snow & Co.
Attorneys

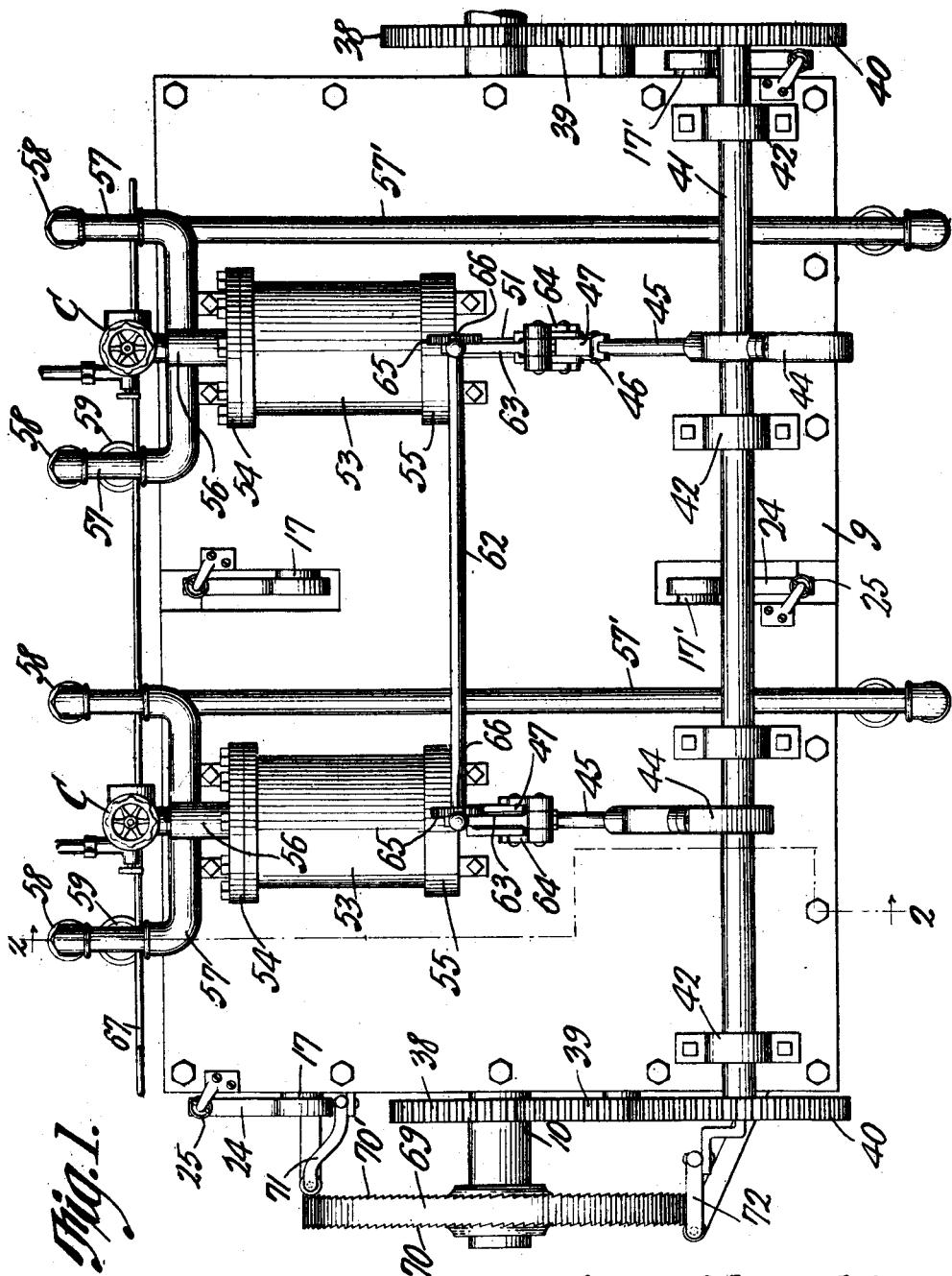

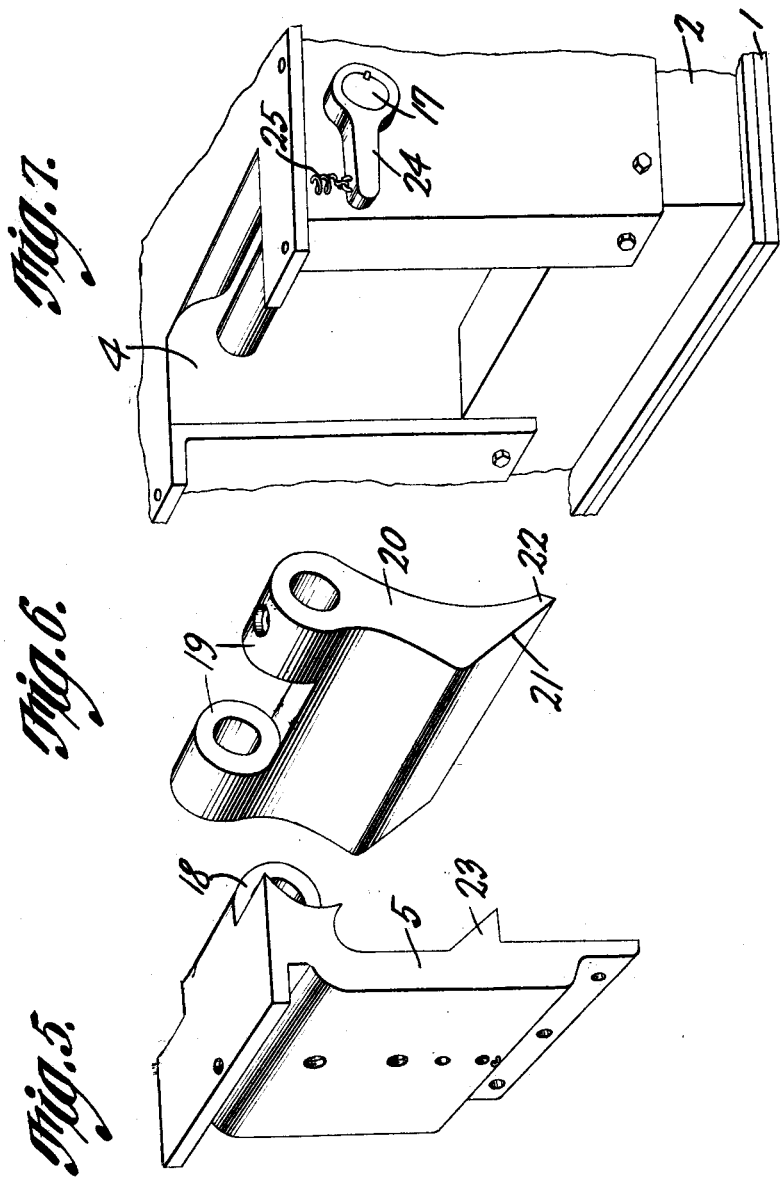

A. MORASKI.
ROTARY INTERNAL COMBUSTION ENGINE.
APPLICATION FILED MAY 19, 1914.
1,119,189.
Patented Dec. 1, 1914.
4 SHEETS—SHEET 1.
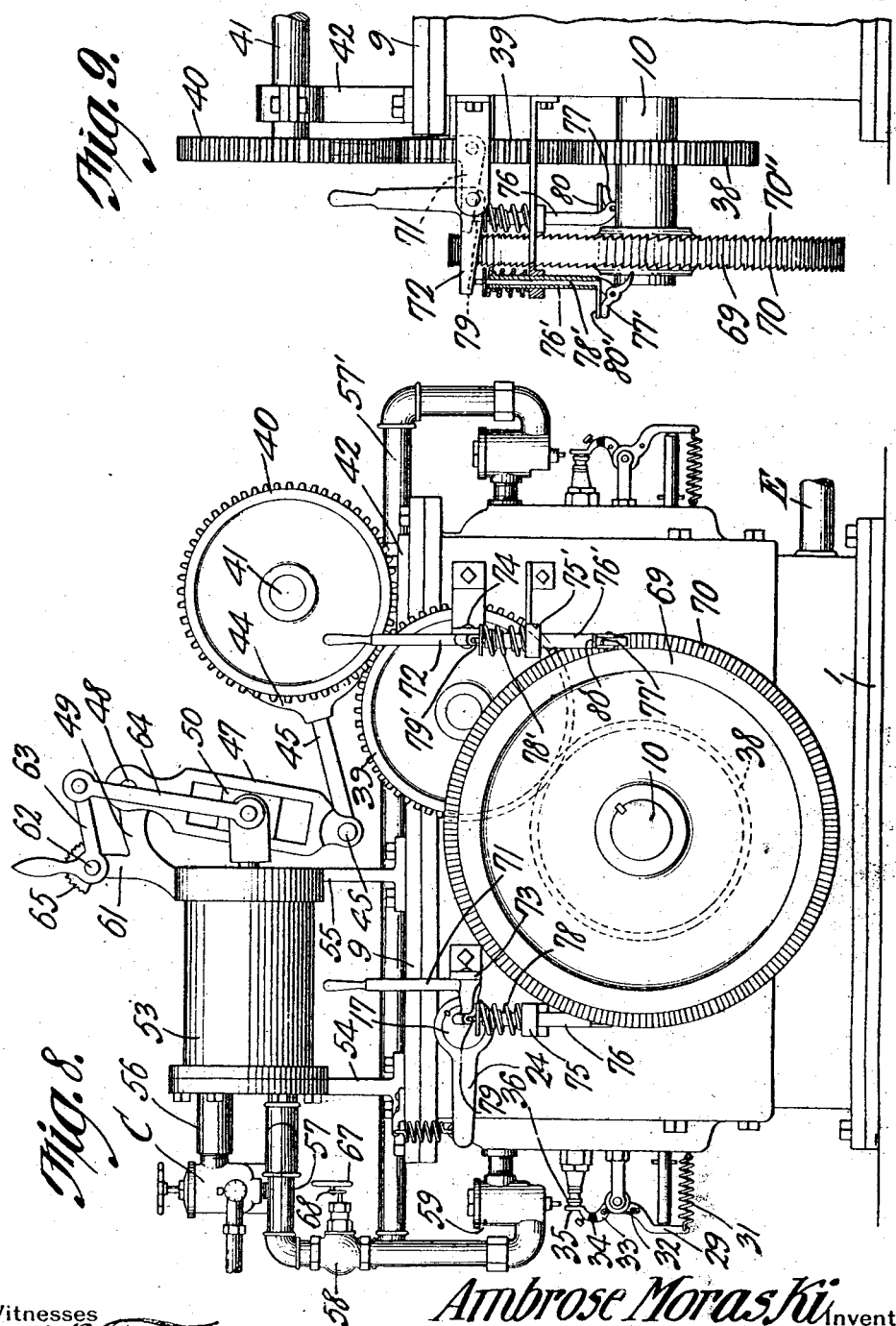
Witnesses
Ambrose Moraski, Inventor
by C. A. Snow & Co.
Attorneys

UNITED STATES PATENT OFFICE.

AMBROSE MORASKI, OF ST. LOUIS, MISSOURI.

ROTARY INTERNAL-COMBUSTION ENGINE.

1,119,189. Specification of Letters Patent. Patented Dec. 1, 1914.

Application filed May 19, 1914. Serial No. 839,566.

*To all whom it may concern:*

Be it known that I, AMBROSE MORASKI, a citizen of the United States, residing at St. Louis, in the State of Missouri, have invented a new and useful Rotary Internal-Combustion Engine, of which the following is a specification.

The present invention relates to improvements in rotary internal combustion engines, one object of the invention, being the provision of a compact engine of this character, in which the explosive charge is compressed and delivered into a primary combustion chamber and exploded so that the expanding gases therefrom will be directed at the proper time to the piston or pocket of the rotor, such engine being composed of a plurality of such mechanisms and a similar number or in fact any number for reversing the same.

A further object of the present invention is the provision of a combustion chamber sealing means adapted to coöperate with the rotor to assist in energizing the ignition system at the proper time, the rotor being the timing member to insure the explosion of the compressed charge at the proper time and the delivery of the expanding gas from the combustion chamber to impart movement to the rotor.

A still further object of the present invention is the provision of an adjustable manually controlled means for regulating the throw of the charge compressing and delivering plunger and consequently the compression of the explosive charge.

With the foregoing and other objects in view which will appear as the description proceeds, the invention resides in the combination and arrangement of parts and in the details of construction hereinafter described and claimed, it being understood that changes in the precise embodiment of the invention herein disclosed can be made within the scope of what is claimed without departing from the spirit of the invention.

In the drawings—Figure 1 is a top plan view of an engine constructed according to and embodying the present invention. Fig. 2 is a section taken on line 2—2 of Fig. 1. Figs. 3 and 4 are views on a smaller scale showing the relative position of one rotor after the explosion of the charge and at the exhaust point thereof, respectively. Figs. 5, 6 and 7 are perspective views of the explosion chamber and the adjacent portion of the stator. Fig. 8 is a view in elevation of the complete engine taken from the fly wheel end thereof. Fig. 9 is a side elevation of the fly wheel and adjacent portion of the casing, showing the starting mechanism.

Referring to the drawings, the numeral 1 designates the base plate of the present engine, which has disposed therein, the member 2, which constitutes a plurality of rotor chambers 3, one being shown in the present instance. Adjacent each rotor chamber 3 and opening through the outside wall of the stator, as shown in Fig. 7, is the recess 4 which is adapted to be sealed by the member 5, clearly shown in detail in Fig. 5. An exhaust port 7 is provided in the stator adjacent each rotor chamber thereof, the same exhausting into the chamber 7' and through the exhaust pipe E.

A water jacketing space J is provided around the respective rotor chamber carrying portions of the stator, the plate 8 sealing the uppermost portion thereof while the plate 9 is fitted above the stator portion and fast thereto for carrying the compression mechanism as will presently appear.

The shaft 10 is extended through the stator member of the present engine, and has keyed thereupon within each rotor chamber 3, its respective rotor 11, which is a cam shaped member provided with the radially projecting portion or shelf 12 and with the lip 13 adjacent thereto which is adapted to engage the peripheral wall of the chamber 3. An opening 14 is provided through the shelf 12 and by means of bolts 15, an adjustable impulse receiving plate 16 is attached thereto. By this means, the outer ends of the plate 16 is adjusted to engage the inner peripheral wall of the chamber 3 and the reduced end 23 of the abutment 20, the detailed structure of which is clearly shown in Fig. 6.

Two shafts 17 and two shafts 17' are journaled for oscillation, one set at opposite points of the upper portion of the stator, as clearly illustrated in Figs. 1 and 2, the shafts 17 constituting the forward rotors controlling shafts, and the shafts 17' constituting the means for assisting in controlling the reverse rotors (not shown).

The sealing member 5 is provided with the journaling apertured lug 18 which is disposed between the two lugs 19 of the member 20 so that the shaft 17 will enter the apertures of these members and thus assist in locking the member 5 in place and at the same time forming a pivoting support for the member 20. The member 20 is provided with the rotor engaging end 22 and with the inclined face 21, which is adapted when the member is in the position as shown in Fig. 2, to rest against the inclined face of the transverse lug of the member 5. Thus the chamber 6 is properly sealed by the member 20 so that the explosive charge introduced therein under pressure will be properly compressed and held against leakage by the coöperation of the rotor 11 with the member 20, and also with the lug 24 and spring 25, which is mounted as shown to return the member 20 from the positions as shown in Figs. 3 and 4 to that shown in Fig. 2.

In order to provide a means for energizing the spark plug 37 at the proper time, such action being accomplished by the impulse receiving plate 16 of the rotor 11, a plunger 26 is mounted below the lug 23 of the member 5 and the adjacent portion of the stator and has its stem 27 projected through the bore or aperture 28 of the member 5 with its outer free end in engagement with the lever 29 fitted in the stem or support 30 attached to the member 5. The spring 31 is connected to the free end of the lever 29 and consequently holds the member or plunger 26 inwardly in engagement with the inclined face 21 of the member 20. This plunger 26 at the proper time, that is when the edge of the plate 16 engages the free end of the member 21, is moved outwardly against the tension of the spring 31, and through the spring 32 imparts inward movement to the member 33 of the lever, so that the free end 35 thereof which is insulated at 34 from the portion 33, engages the terminal 36 of the spark plug 37, so as to cause the closure of the circuit in the ignition system and consequently when the parts are in the position as shown in Fig. 2, the compressed charge within the chamber 6 will be ignited, and the member 20 moved to the position shown in Fig. 3, at which time the expanding gases will be directed against the piston 16 to cause the rotor to move in the direction of the arrow in Fig. 3 and to finally assume the position as shown in Fig. 4, at which time, the exhausting charge is passing through the port 7 before the space between the free end of the member 20 and the plunger 26 is closed.

Any number of rotors 11 may be employed so that the proper rotary motion is imparted to the shaft 10 in a steady manner, a fly wheel 69 being attached to the shaft 10 to assist in such action.

Fixed to each end of the shaft 10 exteriorly of the stator or casing of the present engine, is a gear 38 which meshes with the intermediate gear 39 and thus operates the gear 40 fixed to the shaft 41 and journaled in the brackets 42 upon the top plate 9 of the engine. Fixed to the shaft 41 are two eccentrics 43, each one of which operates through the eccentric strap 44, the rod 45, whose opposite end is connected by the pin 46 to the lower free end of the yoke or cross head carrying member 47. This member 47 is pivoted at 48 to the arm 49 of the bracket 55. Mounted for sliding movement in the cross head carrying member 47, is a cross head or block 50 which is connected to the piston rod 51 of the explosive charge compressing plunger 52 which is mounted for reciprocation within the cylinder 53. This cylinder 53, as clearly illustrated in Fig. 2, is mounted in the supports 54 and 55 upon the plate 9.

A carbureter C is provided and thus the explosive mixture is drawn in through the pipe 56 into the chamber of the cylinder 53, a check valve being provided to prevent the back flow thereof. A pipe 57 is also provided with the controlling valve 58, and a check valve 59 directing the charge through the port 60 into the chamber 6. In the present instance, two of the pipes 57 and pumping mechanisms are illustrated.

In order to provide a means for regulating the throw of the piston 52 and consequently the amount of the charge and the compressive action thereupon, there is journaled in the arm 61, a shaft 62, provided with two arms 63 one for each of the respective compressing mechanisms, a link 64 being connected to each arm and to the block 50, so that said block may be raised or lowered relatively to the member 47 and to the pivoting point 48, so that the throw of the rod 51 and piston 52 may be shortened or lengthened as desired. A toothed detent 65 which is fixed relatively to the arm 61 is provided, while an engaging pawl or detent 66 is carried by the handle member of the lever 63. Thus the parts may be locked in the desired adjusted position.

The reverse combustion charge directing pipes 57' are controlled through the same mechanism, and by means of the rod 67 and the cranks 68, the valves 58 of the pipes 57 are closed and the pipes 57' are opened, or vice versa, thus permitting the explosive charge forming and compressing members to operate for supplying the charge through either set of the respective pipes 57 or 57'.

As clearly shown in Figs. 1, 8 and 9, the fly wheel 69 is provided with the two sets of teeth 70 and 70' which are operated by the respective manually controlled bell crank levers 71 and 72, mounted in brackets 73 and 74. In each bracket 75—75' is slidably mounted a sleeve 76—76', having the pivoted pawl 77—77' in its lower end. The spring 78—78', normally holds the pawl 76—76' elevated and out of engagement with the teeth 70—70'. The rod 79—79' is slidably mounted in the sleeve 76—76' and has the pawl engaging end 80—80'; its upper end being normally above the top of the sleeve and engaging its lever. Thus the pulling upon the lever 71, will first cause the rod 79 to move downwardly so that the pawl 77 will be placed to engage one of the teeth 70, the continued movement of the lever pushing the sleeve 76 downwardly and through the pawl imparting a partial revolution to each fly wheel. The same operation of the lever 72 imparts a reverse rotation to the fly wheel.

What is claimed is:

1. A rotary internal combustion engine, including a stator having a rotor chamber and a combustion chamber, a pivoted sealing member for the combustion chamber operated for movements to and from the rotor chamber of the stator, a rotor mounted in the rotor chamber of the stator, the periphery of which is cam-shaped and provided with an expanding gas receiving portion, said expanding gas receiving portion co-operating with the combustion chamber sealing member to move the same outwardly and to permit the same to be moved inwardly due to the expansion of an exploded charge, means for compressing and directing the explosive charge to the combustion chamber operably connected to the rotor, and an ignition system operating means disposed in the path to be engaged by the combustion chamber sealing member when depressed by the rotor to energize the ignition system and explode the charge.

2. A rotary internal combustion engine, including a stator having a rotor chamber and a combustion chamber, a pivoted sealing member for the combustion chamber operated for movements to and from the rotor chamber of the stator, a rotor mounted in the rotor chamber of the stator, the periphery of which is cam-shaped and provided with an expanding gas receiving portion, said expanding gas receiving portion co-operating with the combustion chamber sealing member to move the same outwardly and to permit the same to be moved inwardly due to the expansion of an exploded charge, means operably connected to the rotor for compressing and delivering the explosive charge to the combustion chamber, an ignition system operating means disposed in the path to be engaged by the combustion chamber sealing member when the latter is depressed by the rotor to energize the ignition system to explode the charge, said explosive charge compressing and delivering mechanism, including a cylinder, a piston mounted therein for reciprocation, a shaft provided with an eccentric operably connected to the rotor, and a lever mounted upon the stator and operably connected to the eccentric and to the piston.

3. A rotary internal combustion engine, including a stator having a rotor chamber and a combustion chamber in communication therewith, a pivoted combustion chamber sealing member interposed between the rotor chamber and the combustion chamber for movement to and from the rotor chamber, a rotor mounted in the rotor chamber, said rotor being cam-shaped and being provided with an expanding gas receiving projection, said projection being disposed to assist in moving the combustion chamber sealing member outwardly, an explosive charge compressing and delivering mechanism operably connected to the rotor, a plunger mounted in the stator and disposed to be engaged by the free end of the combustion chamber sealing member, when such member is engaged by the projection of the rotor to move the same outwardly, and a spring actuated circuit closing member operably connected to the plunger.

4. A rotary internal combustion engine, including a stator having a rotor chamber and a combustion chamber in communication therewith, a pivoted combustion chamber sealing member interposed between the rotor chamber and the combustion chamber for movement to and from the rotor chamber, a rotor mounted in the rotor chamber, said rotor being cam-shaped and being provided with an expanding gas receiving projection, said projection being disposed to assist in moving the combustion chamber sealing member outwardly, an explosive charge compressing and delivering mechanism operably connected to the rotor, a plunger mounted in the stator and disposed to be engaged by the free end of the combustion chamber sealing member when such member is engaged by the projection of the rotor to move the same outwardly, a spark plug connected in an ignition system, and a pivoted closure member connected to the stator and disposed to be actuated by the plunger when the same is moved outwardly by the combustion chamber sealing member and the rotor.

5. A rotary internal combustion engine, including a stator provided with a rotor chamber and a combustion chamber in communication therewith, said rotor chamber being provided with an exhaust port, a rotor mounted in the rotor chamber, a portion of its periphery providing with the walls of the chamber an expanding gas receiving pocket, a combustion chamber sealing and expanding gas directing member pivoted in the rotor chamber at the intersection thereof with the combustion chamber, means for normally holding the same in combustion chamber sealing position, means for delivering an explosive charge to the combustion chamber, an ignition system, and means adapted to be operated by the combustion chamber sealing member and the rotor for energizing the ignition system to ignite the compressed charge, said latter means including a spark plug, a pivoted switch member operably connected to the stator and normally out of engagement with the spark plug, and spring returned means mounted in the stator for operably engaging the latter means when in engagement with the combustion chamber sealing member and as the latter is moved outwardly by the rotor.

6. A rotary internal combustion engine, including a stator provided with a rotor chamber and a combustion chamber in communication therewith, said rotor chamber being provided with an exhaust port, a rotor mounted in the rotor chamber, the periphery of the rotor having an expanding gas receiving portion, a combustion chamber sealing and exhaust gas directing member pivoted in the rotor chamber at the intersection thereof with the combustion chamber, means for normally holding the same in combustion chamber sealing position, means for delivering an explosive charge to the combustion chamber, an ignition system, means adapted to be operated by the combustion chamber sealing member and the rotor for energizing the ignition system to ignite the compressed charge, said latter means including a spark plug, a two membered pivoted lever connected to the stator and having one member disposed to be placed into engagement with the spark plug to complete an ignition circuit, a plunger mounted for reciprocation within the stator and disposed to be engaged to actuate the lever to close the circuit when the combustion chamber sealing member is engaged by the rotor, and a spring for normally holding said lever with the plunger moved toward the rotor and with the ignition circuit open.

In testimony that I claim the foregoing as my own, I have hereto affixed my signature in the presence of two witnesses.

AMBROSE MORASKI.

Witnesses:
 JOSEPH L. KOHNER,
 LEO BLOCH.